United States Patent [19]

Crespo et al.

[11] Patent Number: 5,293,402

[45] Date of Patent: Mar. 8, 1994

[54] WIDEBAND DIGITAL EQUALIZERS FOR SUBSCRIBER LOOPS

[75] Inventors: Pedro M. Crespo, Bedminster; Michal L. Honig, Montclair, both of N.J.

[73] Assignee: Bell Communications Research, Inc., Livingston, N.J.

[21] Appl. No.: 694,819

[22] Filed: May 2, 1991

[51] Int. Cl.$^5$ .............................................. H03H 7/30
[52] U.S. Cl. .................................... 375/14; 375/103; 375/101
[58] Field of Search ................... 375/12, 13, 14, 101, 375/103; 333/18, 28 R; 364/724.2, 724.17; 370/32.1

[56] References Cited

U.S. PATENT DOCUMENTS

| 5,020,078 | 5/1991 | Crespo | 364/724.2 |
| 5,027,369 | 6/1991 | Kuenast | 375/14 |
| 5,031,194 | 7/1991 | Crespo et al. | 375/14 |
| 5,042,026 | 8/1991 | Koike et al. | 370/32.1 |
| 5,097,482 | 3/1992 | Serizawa et al. | 364/724.2 |
| 5,117,291 | 5/1992 | Fadavi-Ardekani et al. | 333/18 |

OTHER PUBLICATIONS

"Adaptive IIR Filtering," J. J. Shynk, *IEEE ASSSP Magazine*, vol. 6, No. 2, pp. 4–21, Apr. 1989.
"Adaptive IIR Filtering: Current Results and Open Issues," C. R. Johnson, *IEEE Transactions on Information Theory*, vol. IT-30, No. 2, pp. 237–250, Mar. 1984.
"Adaptive Noise Canceling: Principles and Applications," B. Widrow et al., *IEEE Proceedings* vol. 63, No. 12, pp. 1692–1716, Dec. 1975.
"A New Adaptive IIR Filter," H. Fan and W. K. Jenkins, *IEEE Transactions on Circuits and Systems*, vol. CAS-33, No. 10, pp. 939–947, Oct. 1986.
"A Technique for the Identification of Linear Systems," K. Steiglitz and L. McBride, *IEEE Transactions on Automatic Control*, vol. AC-10, pp. 461–464, Oct. 1965.
"Convergence Models for Adaptive Gradient and Least Mean Squares Algorithms," M. L. Honig, *IEEE Transactions on ASSP*, vol. 31, No. 2, pp. 415–425, Apr. 1983.
"Lattice Filters for Adaptive Processing", by B. Friedlander, *Proceeding of the IEEE*, vol. 70, No. 8, pp. 829–868, Aug. 1982.

*Primary Examiner*—Stephen Chin
*Assistant Examiner*—Young Tse
*Attorney, Agent, or Firm*—Leonard Charles Suchyta; James W. Falk

[57] ABSTRACT

A digital decision feedback equalizer utilizes a finite impulse response (FIR) filter and an infinite impulse response (IIR) filter in parallel in the feedback path. The FIR filter compensates for the rapidly changing region of the channel impulse response immediately following the cursor while the IIR filter compensates for the gradually decaying tail of the impulse response of the channel. Modifications of a sequential identification algorithm are used to adapt the filter sections. In particular, in one modification, the inputs to both the poles and zeros sections of the IIR filter are prefiltered by an all-pole filter, where the poles of this filter are the current pole estimates. In another modification, the order of the zeros section of the IIR filter and the all-pole filter are reversed, and the zeros section is adapted using the least mean squares algorithm. A recursive least squares algorithm with exponential fading can be used to adapt the poles and/or zeros section of the IIR filter.

4 Claims, 3 Drawing Sheets

REVERSED ORDER DECISION FEEDBACK EQUALIZER
USING IDENTIFICATION ADAPTATION ALGORITHM

FIG. 1
DUAL ALGORITHM DECISION FEEDBACK EQUALIZER USING RECURSIVE LEAST SQUARES ADAPTATION

FIG. 2

FIG. 3
DUAL FEEDBACK EQUALIZER
(PRIOR ART)

FIG. 4

PRIOR ART DUAL DECISION FEEDBACK EQUALIZER
USING EQUATION ERROR ADAPTATION

FIG. 5

IDENTIFICATION ADAPTION ALGORITHM

FIG. 6

REVERSED ORDER DECISION FEEDBACK EQUALIZER USING IDENTIFICATION ADAPTATION ALGORITHM

WIDEBAND DIGITAL EQUALIZERS FOR SUBSCRIBER LOOPS

TECHNICAL FIELD

This invention relates to digital signal transmission and, more particularly, to the recovery of digital pulse signals after transmission over noisy narrow band transmission channels such as telephone subscriber loops.

BACKGROUND OF THE INVENTION

Decision feedback equalizers have been used to recover digital signals after transmission over narrow band channels. If the intersymbol interference caused by such a channel is represented by its impulse response, this impulse response includes a positive maxima, called the "cursor" and representing the preferred data signal, and an extended region extending on both sides of the maxima. Precursor intersymbol interference signals (preceding the cursor) are typically canceled by an in-line filter in the received signal path while the post cursor intersymbol interference is canceled by an adaptive feedback filter. It has been proposed in the copending application of the present applicants, Ser. No. 392,773, filed Aug. 11, 1989, now matured into U.S. Pat. No. 5,031,194, issued Jul. 9, 1991, and assigned to applicants' assignee, to break the post-cursor region of the impulse response into two contiguous regions, a rapidly varying region compensated by a finite impulse response (FIR) and a slowly changing tail region compensated by an infinite impulse response (IIR), or pole-zero filter. The FIR filter includes a moderate number of taps since the intersymbol interference due to the rapidly varying region is limited. The IIR filter, although canceling a much longer region, has only a few taps because the tail of the impulse response is accurately modeled by a two-pole filter section. Both the FIR filter and the IIR filter are adapted using the equation error algorithm. It is to be noted that the equation error minimized in the abovenoted patent application is not the true performance criterion. The configuration described therein trades residual intersymbol interference, caused by a biased channel estimate, for noise enhancement, caused by a longer prefilter.

J. J. Shynk in "Adaptive IIR Filtering," *IEEE ASSP Magazine*, Vol. 6, No. 2, pages 4-21, April 1989, and C. R. Johnson, in "Adaptive IIR Filtering: Current Results and Open Issues," *IEEE Transactions on Information Theory*, Vol. IT-30, No. 2, pages 237-250, March 1984, have described the use a gradient algorithm to adapt IIR filters in other applications. Unfortunately, in this algorithm, the coefficients of the filters are strongly interdependent, resulting in very slow convergence.

It has also been proposed to use an identification algorithm for adapting infinite impulse response filters in another context by K. Steiglitz and L. McBride in "A Technique for the Identification of Linear Systems," *IEEE Transactions on Automatic Control*, Vol. AC-10, pages 461-464, October, 1965. Unfortunately, this algorithm is designed for use with stored blocks of data and is not useful for serial sequential data as is found in subscriber loop data transmission. Moreover, this algorithm is computationally expensive.

A sequential version of the identification algorithm of the Steiglitz and McBride article is proposed by H. Fan and W. K. Jenkins in "A New Adaptive IIR Filter," *IEEE Transactions on Circuits and Systems*, Vol. CAS-33, No. 10, pages 939-947, October, 1986. Unfortunately this sequential identification algorithm converges no more quickly than the gradient algorithm described above.

SUMMARY OF THE INVENTION

In accordance with the illustrative embodiment of the present invention, the sequential identification algorithm of Fan and Jenkins is modified to avoid the slow convergence in a dual filter feedback equalizer. In one embodiment, the order of the poles and zeros sections of the infinite impulse response filter is reversed so that the input to the system zeros section of the filter is the uncorrelated transmitted symbols. The zeros section of the infinite impulse response filter converges substantially faster (four or five times) than when its input is first filtered by the poles filter section. In another embodiment of the present invention, the poles section (and perhaps the zeros section also) of the IIR portion of the feedback filter is adapted with a recursive least square (RLS) algorithm with an exponentially fading memory, rather than the prior art least mean squares (LMS) algorithm. The recursive least square (RLS) algorithm converges much faster than the least mean squares (LMS) algorithm and involves little added complexity for an infinite impulse response filter with only two poles. The zeros portion of the infinite impulse response filter, and the finite impulse response filter section, are adapted using the prior art LMS algorithm. This arrangement has the advantage of permitting the use of ARMA lattice filters.

The major advantage of dual feedback equalizers in accordance with the present invention is the improved robustness and improved convergence of the algorithms without any increase in the total number of filter taps.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 2:
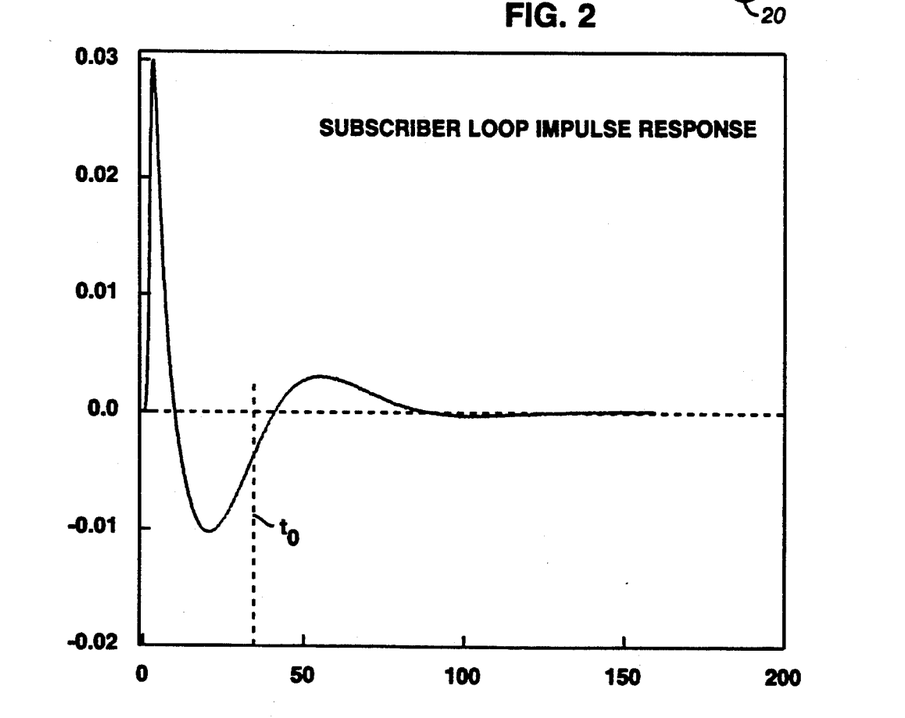
FIG. 2 shows a graphical view of a typical impulse response of a subscriber loop in which the present invention might find use.

Before proceeding to a detailed description of the present invention, it is believed to be valuable to provide a background discussion on decision feedback equalization. Decision feedback equalization has been widely proposed as an effective technique for suppressing intersymbol interference (ISI) in the context of high speed digital communications over dispersive channels. A particularly attractive application for decision feedback equalization is in high speed digital subscriber lines. Channel dispersion in this case causes severe intersymbol interference at high data rates (i.e., 800 kbits/sec), which means that the decision feedback filter must contain many taps, assuming a conventional implementation. As an example, a measured subscriber loop impulse response corresponding to 12 kilofeet of 24 gauge twisted-pair wire is shown in FIG. 2. The lead time before the leading edge of the impulse response is the group delay of the channel. Assuming that this impulse response includes the effect of filtering at the transmitter and receiver, then precursor intersymbol interference is caused by the portion of the impulse response preceding the cursor, and postcursor intersymbol interference is caused by the tail of the impulse response.

In general, for the subscriber loop application the prefilter in the decision feedback equalizer typically requires few taps (i.e., five or less) to adequately suppress precursor intersymbol interference. To minimize mean squared error (MSE), however, the number of taps in the feedback filter must span almost the entire tail of the impulse response to cancel postcursor intersymbol interference. The number of taps in the feedback filter is therefore approximately $\tau/T$, where $\tau$ is the length of the impulse response tail, and T is the time between samples. For the impulse response in FIG. 2, $\tau$ is approximately 200 $\mu$seconds, so that a symbol rate of 500 Kbauds implies that the feedback filter should have approximately 100 taps.

Figure 3:
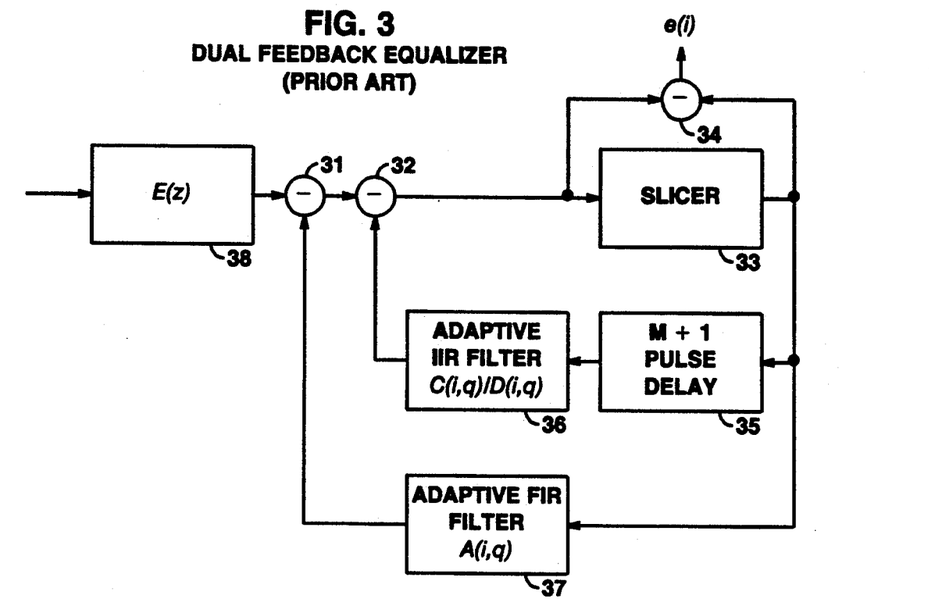
FIG. 3 shows the prior art dual feedback equalizer of which the present invention is an improvement.

In the case of the subscriber loop with the impulse response of FIG. 2, and as described in the aforementioned application of the present applicants, the end portion of the impulse response typically decays smoothly to zero, and can be accurately modeled as the impulse response of a one- or two-pole transfer function. Such a configuration is shown in FIG. 3. The dual feedback filter of FIG. 3 comprises a prefilter 38 to which received signals are applied. After traversing prefilter 38, signals pass through two cascaded differencing circuits 31 and 32 to a slicer 33. Slicer 33 produces the best estimate of the data symbol, given the input. A differencing circuit 34 determines the difference between the input and the output of slicer 33. This difference is a measure of the error e(i) in the output of slicer 33 and is used to adjust the tap coefficients of the feedback filters 36 and 37. The output of slicer-detector 33 is applied to an adaptive finite impulse response (FIR) filter 37 which is used to cancel the portion of the response of FIG. 2 between the cursor (maximum amplitude) of the impulse response and the time $t_0$. The output of filter 37 is applied to differencing circuit 31.

The output of slicer-detector 33 is also applied through a delay circuit 35 to an adaptive infinite impulse response (IIR) filter 36. With very few taps, filter 36 is able to compensate for the smoothly decaying portion of the impulse response following $t_0$ in FIG. 2. The output of filter 36 is applied to differencing circuit 32. The number of taps on the combination of filters 36 and 37 is much fewer than the taps required on a single FIR feedback filter providing the same level of cancellation.

As shown in FIG. 3, applicants' prior application provides a feedback filter consisting of two sections: a finite impulse response filter 37 that compensates for the initial part of the postcursor impulse response, which may be relatively difficult to model with an infinite impulse response filter, and a one- or two-pole infinite impulse response filter 36 that compensates for the tail of the postcursor impulse response. For example, the finite impulse response filter needed to cancel the initial part of the postcursor impulse response in FIG. 2 is approximately one third the length of an original single finite impulse response feedback filter, and only two or three additional taps are needed to cancel the remaining tail.

Figure 4:
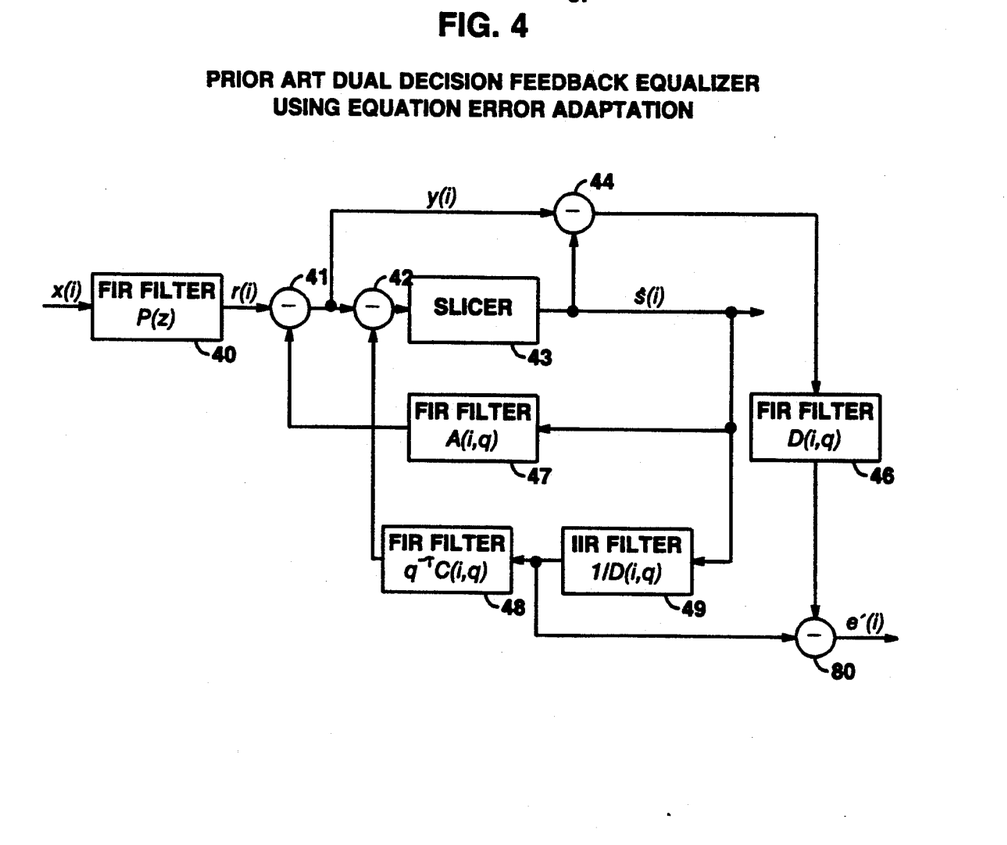
FIG. 4 shows the prior art dual feedback equalizer of FIG. 3 accommodating the equation error adaptation algorithm.

The equation error method was proposed in the aforemention application of the present applicants for adapting filters 36 and 37. This arrangement is shown in FIG. 4, and has the advantage that the error surface is unimodal, so that the tap weights converge to a unique solution. In the presence of noise, however, this algorithm gives a biased estimate of the poles of the channel transfer function, resulting in significant residual intersymbol interference. This is a considerable disadvantage of the equation error method in a subscriber loop environment.

More particularly, when the equation error method is used, as in FIG. 4, to optimize the pole-zero decision feedback equalizer, the denominator polynomial 46 in the pole-zero feedback filter appears in cascade with the channel transfer function and the prefilter 80. Adding poles to the pole-zero decision feedback equalizer when the equation error method is used to optimize the feedback filter is therefore analogous to adding taps to the prefilter of a conventional decision feedback equalizer. In the former case, a biased channel estimate causes residual intersymbol interference, and in the latter case, a longer prefilter causes additional noise enhancement. The output mean squared error for the pole-zero structure, when adapted via the equation error method, is typically larger than the mean squared error of a conventional decision feedback equalizer of the same complexity.

Figure 6:
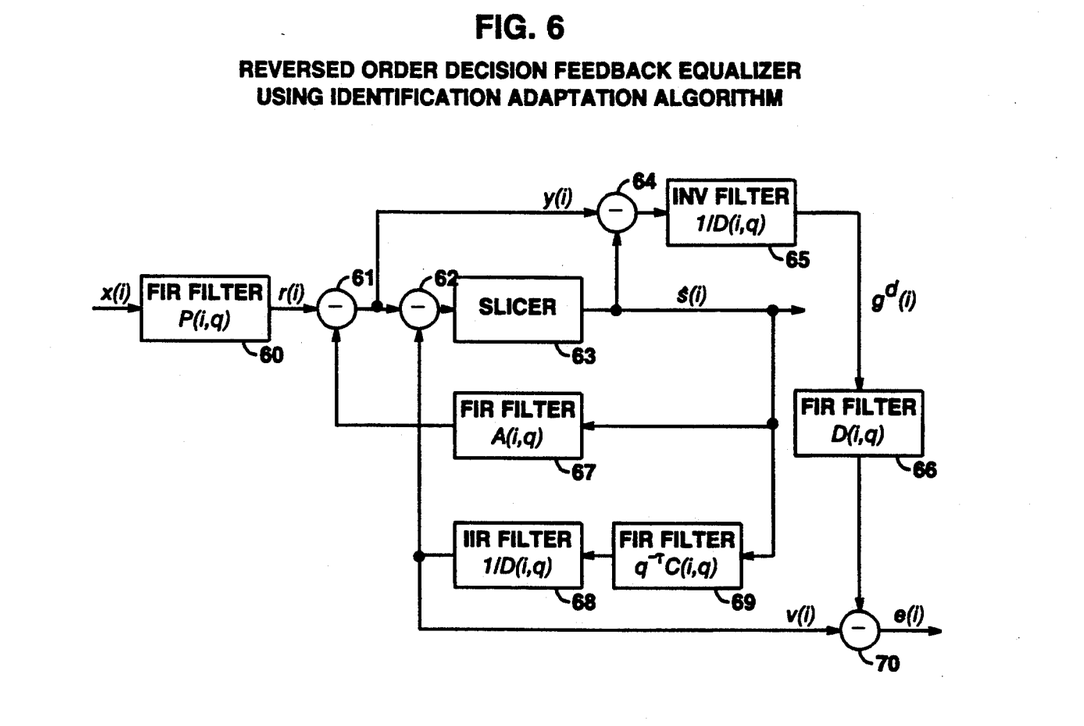
FIG. 6 is a detailed block diagram of the reversed order decision feedback filter in accordance with the present invention and which may utilize the identification algorithm of FIG. 5.

The dual feedback filters of FIG. 4 can also be adapted by other algorithms, including gradient algorithms. Such algorithms, however, exhibit extremely slow convergence. In accordance with the present invention, such slow convergence is avoided by utilizing modifications of the identification adaptation algorithm disclosed in "A Technique for the Identification of Linear Systems," by K. Steiglitz and L. McBride, *IEEE Transactions on Automatic Control*, Volume AC-10, pages 461–464, October 1965. One modification involves the switching of the order of the two filter sections 18 and 19 of FIG. 1, as shown in FIG. 6, where section 18 estimates the system zeros and section 19 contains current estimates of the system poles. A second modification consists of using a different algorithm to update the infinite impulse response filter. More particularly, a recursive least square (RLS) algorithm rather than the least mean square (LMS) used to update the infinite impulse response filter section 47 of FIG. 1. A detailed description of these two modifications will be discussed in connection with the two embodiments of the present invention disclosed in FIGS. 1 and 6, respectively.

Figure 1:
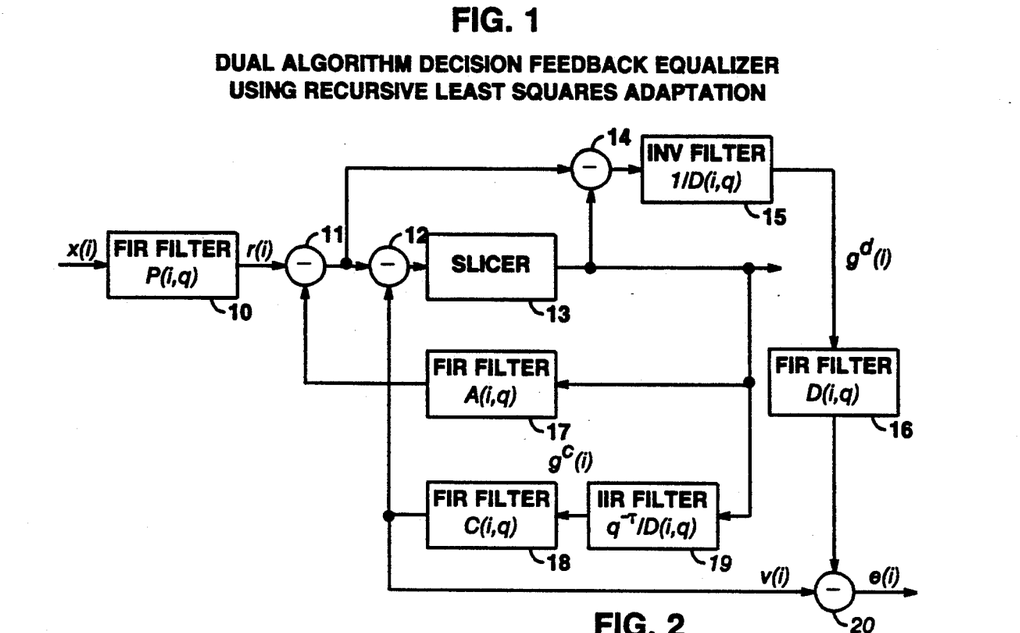
FIG. 1 shows a detailed block diagram of a dual algorithm decision feedback filter in which the poles and zeros section of the infinite impulse response filter of a dual feedback equalizer may be adapted by a recursive lease squares algorithm in accordance with the present invention.

Before proceeding to a description of FIGS. 1 and 6, a detailed analysis of the prior art structure of FIG. 4 will be undertaken in order to assist in the understanding of the invention. FIG. 4 shows a block diagram of applicants' prior application adaptive version of the decision feedback equalizer using the equation error method. The output of the P(z) prefilter 40 in FIG. 4 at time iT, where 1/T is the baud rate, is given by $$r(i) = \sum_{k=-\infty}^{\infty} s(k)h(i-k) + n(i) \qquad (1)$$

where $h(i)$ is the ith sample of the equivalent discrete-time impulse response of the channel including filtering at the transmitter, receiver, and P(z), $s(k)$ is the kth transmitted symbol, and $\{n(i)\}$ is a white noise sequence. It will be assumed that $h(0)=1$. That is, an automatic gain control ensures that the cursor is set to one.

Except for P(z) filter 40, all of the filters shown in FIG. 4 are assumed to be adaptive, and are therefore time-varying. In order to distinguish a transfer function that is being adapted from the standard z-transform, which assumes a time-invariant filter, we use the arguments (i,q) to denote a time-varying transfer function, where q replaces z as the delay operator. That is, $$A(i,q) = \sum_{k=1}^{\tau-1} a_k(i) q^{-k} \qquad (2)$$

where $a_k(i)$, $k=1,\ldots,\tau-1$, are the filter coefficients at time i. The output of A(i,q) at time i in response to the input sequence $\{\hat{s}(k)\}$ is denoted as $$A(i,q)[\hat{s}(i)] = \sum_{k=1}^{\tau-1} a_k(i)\hat{s}(i-k). \qquad (3)$$

Let H(z) denote the z-transform of the overall channel impulse response sequence $\{h(i)\}$. Then it is easily verified that the equation error shown in FIG. 4 is given by $e'(i) = D(i,q)[n(i)]$ if $$H(z) = 1 + A(z) + z^{-\tau} \frac{C(z)}{D(z)},$$

and the symbol decisions $\hat{s}(i)=s(i)$ for every i. It is assumed that C(z)/D(z) has at most two poles, that is, $$\frac{C(z)}{D(z)} = \frac{c_0 + c_1 z^{-1}}{1 - d_1 z^{-1} - d_2 z^{-2}}. \qquad (4)$$

Figure 5:
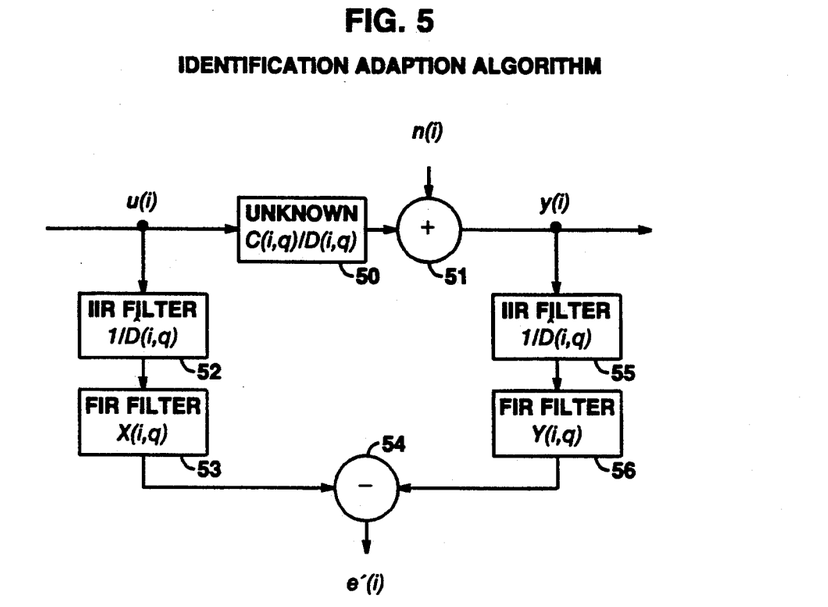
FIG. 5 shows a block diagram of the prior art identification algorithm, modifications of which are used in the feedback equalizers of FIGS. 1 and 6.

In order to explain the algorithms that follow, a brief description of the identification algorithm described in "A Technique for the Identification of Linear Systems," by K. Steiglitz and L. McBride, *IEEE Transactions on Automatic Control*, Volume AC-10, pages 461–464, October 1965, will be given in connection with FIG. 5. In FIG. 5, the unknown system is represented by block 50. The output of block 50 is applied to adder circuit 51 where a noise signal n(i) is added to the system output. The input u(i) to block 50 is applied through $1/\hat{D}(z)$ inverse filter 52 to X(z) filter 53, representing the estimate of C(z). Similarly, the output y(i) of adder 51 is applied through $1/\hat{D}(z)$ inverse filter 55 to Y(z) filter 56, representing the estimate of D(z). The outputs of blocks 53 and 56 are differentially combined in subtracter circuit 54 to form the error signal e'(i). All of the filters 52–56 are adapted by the error signal e'(i) so as to minimize the variance in this error.

More particularly, referring to FIG. 5, suppose that the unknown system 50 with rational transfer function C(z)/D(z) is to be identified with a finite number of input data samples $u(0), \ldots, u(N-1)$. Suppose that the N' outputs from circuit 51, $y(0), \ldots, y(N'-1)$, are observed where $N' \geq N$. Any reasonable windowing scheme for the input data can be assumed. Let $1/\hat{D}(z)$ filter 52 or 55 in FIG. 5 be some fixed filter. Then by solving a set of linear equations, the values of filters X(z) (filter 53) and Y(z) (filter 56) can be computed so as to minimize the sum of the squared equation errors, $$\sum_{i=0}^{N'} e'^2(i).$$

If $\hat{D}(z)=1$, this is simply the equation error method and the resulting estimate of D(z), namely Y(z), is biased. However, if $\hat{D}(z)=D(z)$, then the estimates obtained will be unbiased when the noise is white. In the case when the noise is colored, the minimum value of the error $E[e'^2(i)]$ will be less than $E[n^2(i)]$.

The preceding observation is the basis of the modifications of the identification algorithm forming the basis of the present invention. Using the identification algorithm, the following iterative estimation scheme can be used:

(i) Initialize $$\hat{D}(z) = 1. \qquad (5)$$

(ii) Compute the X(z) and Y(z) that minimize $$\sum_{i=0}^{N'} [e'(i)]^2$$

in FIG. 5.

(iii) Set $\hat{D}(z) = Y(z)$.

(iv) Repeat from (ii) until $\hat{D}(z)$ and Y(z) are sufficiently close.

It is also possible to use the above identification algorithm (5) to estimate the prior art feedback filters (4), given a block of transmitted symbols and the corresponding channel outputs. However, the least squares (LS) estimate in step (ii) of algorithm (5) is computationally expensive to obtain, and this step must be executed many times. An algorithm that processes the data sequentially is also desirable in many applications, including subscriber loop equalization.

A sequential infinite impulse response adaptive algorithm, based on the identification algorithm described above, has been proposed in the Fan and Jenkins article noted above. In this sequential identification algorithm, rather than computing the least squares estimate in step (ii), for fixed $\hat{D}(z)$, it is possible to adapt X(i,q) and Y(i,q) with the standard least mean squares algorithm. Furthermore, since Y(i,q) should converge to D(i,q), $\hat{D}(z)$ in FIG. 5 can be replaced by Y(i,q). Applying this sequential adaptive algorithm to the pole-zero decision feedback equalizer of FIG. 1 results in the following algorithm:

$$g^c(i) = \frac{1}{D(i,q)} [\hat{s}(i-\tau)] \qquad (6a)$$

-continued $$v(i) = \frac{C(i,q)}{D(i,q)} [\hat{x}(i - \tau)] \quad (6b)$$

$$g^d(i) = \frac{1}{D(i,q)} [y(i) - \hat{x}(i)] \quad (6c)$$

$$e(i) = y(i) - \hat{x}(i) - v(i) \quad (6d)$$

$$c_k(i + 1) = c_k(i) + \beta g^c(i - k)e(i), k = 0, 1 \quad (6e)$$

$$d_k(i + 1) = d_k(i) + \beta g^d(i - k)e(i), k = 1, 2. \quad (6f)$$

where $\beta$ is the step-size, and $g^d(i-k) \approx \partial e(i)/\partial d_k(i)$, and $g^c(i-k) \approx \partial e(i)/\partial c_k(i)$. Note that $$g^c(i) = \frac{1}{D(i,q)} [\hat{x}(i - \tau)] = \hat{x}(i - \tau) + \sum_{k=1}^{2} d_k(i)g^c(i - k). \quad (7)$$

The filter P(i,q) can be updated in the conventional way:

$$P_k^{(i+1)} = P_k^{(i)} + \beta' x(i-k)e(i), k=0, 1, \ldots, K, \quad (8)$$

where $P_k^{(i)}$, $k=0, 1, \ldots, K$ are the coefficients of P(i,q), x(i) is the input to P(i,q) at time i, and $\beta'$ is a step-size that may be different from $\beta$ in equations (6). This algorithm can be applied to the structure of FIG. 1. Because the cascaded filters 1/D(i,q) and D(i,q) in FIG. 1 result in a (time-invariant) unity transfer function, the error e(i) in FIG. 1 is given by equation (6d).

It has been found that the sequential identification algorithm of Fan and Jenkins does not immediately improve upon the performance of the adaptive infinite impulse response algorithms. Modifications to this algorithm in accordance with the present invention, however, do markedly improve performance for the subscriber loop application. More particularly, and referring to FIG. 5, the order in which the filters 52 and 53 (1/D̂(z) and X(z), respectively) appear is intrinsic to the identification algorithm. That is, the output of the filter 52 (1/D̂(z)) in response to the input sequence {u(i)} is used to compute X(z), so that the order of these filters cannot be reversed. If, however, a sequential algorithm such as the least mean squares algorithm is used to adapt X(i,q) and Y(i,q), then in steady state it does not matter whether or not X(i,q) filter 53 comes before or after 1/D̂(i,q) filter 52. This simple interchange, however, can have a dramatic effect on the convergence properties of the algorithm and can be applied to the equalizer shown in FIG. 6.

More particularly, in the system identification algorithm, the input sequence {u(i)} in FIG. 5 consists of the transmitted symbols, which are typically uncorrelated. Filtering this sequence by 1/D̂(z) causes the input to X(z) filter 53 in FIG. 5 to be correlated. Loosely speaking, the closer the zeroes of D̂(z) are to the unit circle, the more correlated the output of 1/D̂(z) filter 52 will be. It is well known that the least mean squares algorithm converges much faster in response to uncorrelated data, as opposed to a strongly correlated input. Consequently, faster convergence relative to that of the unmodified sequential identification algorithm of Fan and Jenkins should be obtained by using an uncorrelated sequence as the input to X(i,q) filter 53, and placing 1/D̂(i,q) filter 52 after X(i,q) filter 53.

This modified identification algorithm, in which the order of the filters 18 and 19 in FIG. 1 is reversed (1/D(i,q) and C(i,q)), is illustrated in FIG. 6. The finite impulse response filters D(i,q) and C(i,q) are adapted to minimize $E[e^2(i)]$ via the least mean squares algorithm, assuming that the all-pole filter 1/D(i,q) is time-invariant. Of course, 1/D(i,q) is time-varying and is determined by the current estimate D(i,q). Specifically, the sequential identification algorithm for the reversed order filters of FIG. 6 is:

$$g^d(i) = \frac{1}{D(i,q)} [y(i) - \hat{x}(i)] \quad (9a)$$

$$e(i) = y(i) - \hat{x}(i) - \frac{C(i,q)}{D(i,q)} [\hat{x}(i - \tau)] \quad (9b)$$

$$d_k(i + 1) = d_k(i) + \beta g^d(i - k)e(i), k = 1, 2 \quad (9c)$$

$$c_k(i + 1) = c_k(i) + \beta \hat{x}(i - \tau - k)e(i), k = 0, 1. \quad (9d)$$

Filters 67 (A(i,q)) and 60 (P(i,q)) can be adapted via the least mean squares algorithm. Although the algorithm of equations (9) assumes a second-order Pole-zero filter, generalizations to higher order pole-zero filters is obvious to persons of ordinary skill in the art.

The input to filter 69 in FIG. 6 is the sequence of uncorrelated transmitted symbols. Assuming for the moment that 1/D(i,q) is time-invariant, the statistics of the error e(i) in FIG. 6 will be the same as the statistics of e(i) in FIG. 1. Consequently, C(i,q) in FIG. 6 converges faster than C(i,q) in FIG. 1 when the least mean squares algorithm is used to update the coefficients, where $\beta$ is the step size, i is the sample index, k is the tap index of said filters, $c_k$ is the kth tap weight for the numerator C or zeros section of the transfer function of said infinite impulse response filter, $d_k$ is the kth tap weight for the denominator D or poles section of the transfer function of said infinite response filter, $(\tau-1)$ is the number of taps in said finite impulse response filter, y(i) is the partially processed input signal, and ŝ(i) is the ith output sample from said equalizer.

Of course, it is also possible to switch the order of the cascaded filters 1/D(i,q) and D(i,q) in FIG. 1. However, because the signal y(i)−ŝ(i) is correlated, adapting D(i,q) with this signal instead of $g^d(i)$, as in equations (9), is unlikely to offer a substantial improvement in performance.

For any fixed D̂(z) in FIG. 5, the least squares (LS) estimate of X(z) and Y(z) in step (ii) of the Steiglitz-McBride identification algorithm can be obtained sequentially. That is, least squares estimates for Y(z) and X(z), given N+1 input and output samples, can be obtained recursively from the least squares estimates of Y(z) and X(z) given N input and output samples plus some additional state information. Once the recursive least squares (RLS) algorithm has converged for fixed D̂(z), we can then replace D̂(z) by Y(z), reinitialize the recursive least squares algorithm, and recompute X(z) and Y(z).

The recursive least squares algorithm must be reinitialized after updating D̂(z), since otherwise state information corresponding to the old D̂(z) would be retained, thereby corrupting successive estimates. This has the disadvantage, however, that periodically the recursive least squares algorithm must be terminated and restarted with zero state information, so that the resulting estimates of Y(z and X(z) are quite poor until the algorithm has once again converged. An attractive alternative is to use an recursive least squares algorithm with exponentially fading memory. That is, the weighted sum of squared errors, $$\sum_{i=0}^{N} w^{N-i} [e(i)]^2,$$

is minimized for each N. This way, the algorithm discounts past input data and can track changing input statistics, which is caused by updating $\hat{D}(i,q)$ in FIG. 5.

The rate at which $D(i,q)$ is updated determines how fast the statistics of the input to the recursive least squares algorithm are changing. For fastest convergence, it is desirable to update $\hat{D}(i,q)$ as fast as possible, while still maintaining stability. Algorithm stability also depends critically on the exponential weight w. As w decreases, the recursive least squares algorithm tracks changing statistics faster, although the variance of the estimate increases, potentially causing instability. $\hat{D}(i,q)$ is preferable updated at each iteration, so that the stability and convergence speed of the algorithm is determined solely by w. For the two-pole example considered below, taking w=0.999 will give satisfactory results.

To show how the adaptive infinite impulse response algorithm just described can be applied to the proposed pole-zero decision feedback equalizer, the following vectors associated with FIG. 1 are defined:

$$g'(i) = [g^d(i-1), g^d(i-2), g^c(i), g^c(i-1)] \quad (10a)$$

$$d'(i) = [d_1(i), d_2(i), c_0(i), c_1(i)] \quad (10b)$$

The coefficients of $D(i,q)$ and $C(i,q)$ are updated as follows:
Initialization:

$$d(0) = 0, \ R^{-1}(0) = \frac{1}{\delta} I, \ s(i) = g^c(i) = g^d(i) = 0, \ i < 0 \quad (11a)$$

For $i = 0, 1, 2, \ldots$ do:

$$g^c(i+1) = \frac{1}{D(i,q)} [\hat{s}(i+1-\tau)] \quad (11b)$$

$$g^d(i+1) = \frac{1}{D(i,q)} [y(i+1) - \hat{s}(i+1)] \quad (11c)$$

$$e(i+1) = y(i+1) - \hat{s}(i+1) - \frac{C(i,q)}{D(i,q)} [\hat{s}(i+1-\tau)] \quad (11d)$$

$$y(i+1) = R^{-1}(i)g(i+1) \quad (11e)$$

$$R^{-1}(i+1) = \frac{1}{w} \left( R^{-1}(i) - \frac{1}{w + g'(i+1)R^{-1}(i)g(i+1)} [y(i+1)y'(i+1)] \right) \quad (11f)$$

$$d(i+1) = d(i) + [R^{-1}(i+1)g(i+1)]e(i+1) \quad (11g)$$

where
δ is a small constant,
I is the identity matrix,
$C(i,q)$ is the tap weight of the numerator section of the pole-zero feedback filter at sample i,
$D(i,q)$ is the tap weight of the denominator section of the pole-zero feedback filter at sample i, $g^c$ is the output of the poles section of said poles-zero feedback filter in response to the input $\hat{s}$,
$g^d$ is the output of the poles section of said poles-zero feedback filter in response to the input $(y-\hat{s})$,
e is the error estimate used to adapt said equalizer,
R is a sample correlation matrix of partially processed signals, and
w is a constant slightly less than one.

In the initialization δ is chosen to be some small constant that is large enough to ensure stability. The recursive least squares algorithm of equations (11) uses the matrix inversion lemma to compute the inverse of $$R(i) = \sum_{k=0}^{i} w^{i-k} g(k) g'(k). \quad (12)$$

Strictly speaking, $R^{-1}(i)$ in equation (11f) only approximates the inverse of R(i) due to the approximate initial condition.

There are many alternative recursive least square algorithms to the one used in equation (11). Of particular interest are the ARMA lattice algorithms described in "Lattice Filters for Adaptive Processing," by B Friedlander, *Proceeding of the IEEE*, Volume 70, Number 8, August 1982. That is, the filters $C(i,q)$ and $D(i,q)$ in FIG. 1 can be implemented as a single ARMA lattice filter, and the filter $1/D(i,q)$ can also be implemented as an all-pole lattice filter, which greatly simplifies stability checking when $D(i,q)$ has more than two zeroes. In addition, lattice structures are generally less sensitive to roundoff errors than direct form implementations. It is also possible to replace the recursive least squares algorithm of equations (11) by other computationally efficient (so-called "fast") recursive least squares transversal algorithms known in the art. However, since R in equations (11) is a 4×4 matrix, the potential savings in complexity offered by these "fast" recursive least squares algorithms is minor.

A simple way to reduce the complexity of the algorithm of equations (11), while compromising performance only a little, is to use the recursive least squares algorithm to estimate only the poles, that is, $D(i,q)$, and use the standard least mean square algorithm to estimate $C(i,q)$. This arrangement can also be used in FIG. 1.

Specifically, for FIG. 1, we can redefine the vectors $$g'(i) = [g^d(i-1), g^d(i-2)] \quad (13a)$$

$$d'(i) = [d_1(i), d_2(i)] \quad (13b)$$

so that R(i), defined by equation (12), is now a 2×2 matrix. The Steiglitz-McBride identification algorithm can then be used to estimate $D(i,q)$, and $C(i,q)$ can be updated by equations (9). squares algorithm, i.e., via equation (7d). The convergence speed of the resulting algorithm is somewhat slower than when the recursive least squares algorithm is used to update both $D(i,q)$ and $C(i,q)$; however, the savings in complexity makes this an attractive alternative for the application considered.

There are, of course, many other possible variations on the algorithms proposed in this section. In general, the filters $C(i,q)$ and $D(i,q)$ can be updated via any finite impulse response adaptive algorithm, and can be implemented with any finite impulse response filter structure. The resulting estimate for $D(i,q)$ can then be substituted back into the all-pole filter $1/D(i,q)$ in FIG. 1 or 6.

A pole-zero feedback filter has been proposed to reduce the complexity of decision feedback equalization for channels with severe intersymbol interference. Although this pole-zero decision feedback equalizer has been proposed in the context of high speed digital communications over a subscriber loop, it is advantageous whenever the tail of the channel impulse response can be accurately modeled with a two-pole filter. For the impulse response considered in FIG. 2, the proposed pole-zero decision feedback equalizer offers a 3 to 5 dB improvement in mean squared error relative to a conventional decision feedback equalizer having the same complexity at moderate signal-to-noise ratios. It can be shown that this improvement generally increases with signal-to-noise ratio.

It should be clear to those skilled in the art that further embodiments of the present invention may be made by those skilled in the art without departing from the teachings of the present invention.

What is claimed is:

1. A decision filter equalizer for receiving digital pulse transmissions comprising
   a finite impulse response filter in the feedback path of said equalizer,
   an infinite impulse response filter in said feedback path in parallel with said finite impulse response filter,
   said infinite impulse response filter having a zeros section and a poles section, and
   means utilizing a sequential identification algorithm for adapting said finite impulse response filter,
   the zeros section of said infinite impulse response filter preceding the poles section in said feedback path of said infinite impulse response filter.

2. A decision feedback equalizer for receiving digital pulse transmission comprising
   a finite impulse response filter in the feedback path of said equalizer,
   an infinite impulse response filter in said feedback path in parallel with said finite impulse response filter,
   said infinite impulse response filter having a zeros section and a poles section, and
   adapting means utilizing a recursive least squares adaptation algorithm with exponentially decaying memory for adapting said infinite impulse response filter.

3. A decision feedback equalizer for receiving digital pulse transmissions comprising
   a finite impulse response filter in the feedback path of said equalizer,
   an infinite impulse response filter in said feedback path in parallel with said finite impulse response filter,
   said infinite impulse response filter having a zeros section and a poles section,
   the zeros section of said infinite impulse response filter preceding the poles section of said infinite impulse response filter, and
   adapting means utilizing a sequential identification algorithm for adapting said infinite impulse response filter, $$g^d(i) = \frac{1}{D(i,q)} [y(i) - \hat{s}(i)] \quad \text{(a)}$$

$$e(i) = y(i) - \hat{s}(i) - \frac{C(i,q)}{D(i,q)} [\hat{s}(i - \tau)] \quad \text{(b)}$$

$$d_k(i + 1) = d_k(i) + \beta g^d(i - k)e(i), k = 1, 2 \quad \text{(c)}$$

$$c_k(i + 1) = c_k(i) + \beta \hat{s}(i - \tau - k)e(i), k = 0, 1. \quad \text{(d)}$$

where
$\beta$ is the step size,
$i$ is the sample index
$k$ is the tap index of said infinite impulse response filter,
$c_k$ is the kth tap weight for the numerator C or zeros section of the transfer function of said infinite impulse response filter,
$d_k$ is the kth tap weight for the denominator D or poles section of the transfer function of said infinite impulse response filter,
$\tau$ is the total delay, in intertap delay units, of said finite impulse response filter and $(\tau-1)$ is the number of taps in said finite impulse response filter,
$y(i)$ is the difference between the input signal to said equalizer and the output of said finite impulse response filter, and
$\hat{s}(i)$ is the ith output sample from said equalizer.

4. A decision feedback equalizer for receiving digital pulse transmissions comprising
   a finite impulse response filter in the feedback path of said equalizer,
   an infinite impulse filter in said feedback path, in parallel with said finite impulse response filter,
   said infinite impulse response filter having a zeros section and a poles section,
   the zeros section of said infinite impulse response filter preceding the poles section of said infinite impulse response filter, and
   adapting means utilizing a recursive least squares adaptation algorithm with exponentially decaying memory for adapting said infinite impulse response filter,
   said adapting means carrying out the following algorithm: Initialize:

$$d(0) = 0, R^{-1}(0) = \frac{1}{\delta} I, \hat{s}(i) = g^c(i) = g^d(i) = 0, i < 0 \quad \text{(a)}$$

For $i = 0, 1, 2, \ldots$ do:

$$g^c(i + 1) = \frac{1}{D(i,q)} [\hat{s}(i + 1 - \tau)] \quad \text{(b)}$$

$$g^d(i + 1) = \frac{1}{D(i,q)} [y(i + 1) - \hat{s}(i + 1)] \quad \text{(c)}$$

$$e(i + 1) = y(i + 1) - \hat{s}(i + 1) - \frac{C(i,q)}{D(i,q)} [\hat{s}(i + 1 - \tau)] \quad \text{(d)}$$

$$y(i + 1) = R^{-1}(i)g(i + 1) \quad \text{(e)}$$

$$R^{-1}(i + 1) = \quad \text{(f)}$$

$$\frac{1}{w} \left[ R^{-1}(i) - \frac{1}{w + g'(i + 1)R^{-1}(i)g(i + 1)} [y(i + 1)y'(i + 1)] \right]$$

$$d(i + 1) = d(i) + [R^{-1}(i + 1)g(i + 1)]e(i + 1) \quad \text{(g)}$$

where $$g'(i) = [g^d(i - 1), g^d(i - 2), g^c(i), g^c(i - 1)]$$

and

-continued
$$d(i) = [d_1(i), d_2(i), c_0(i), c_1(i)]$$

δ is a small constant,

I is the identity matrix,

C(i,q) is the tap weight of the poles section of the infinite impulse response filter at sample i, $g^c$ is the output of the poles section of said infinite impulse response filter in response to the input $\hat{s}$, $g^d$ is the output of the poles section of said infinite impulse response filter in response to the input $(y-\hat{s})$, e is the error estimate used to adapt said equalizer, R is a sample correlation matrix of partially processed signals, and w is a constant slightly less than one.

* * * * *